United States Patent
Andrew

(10) Patent No.: US 10,866,704 B1
(45) Date of Patent: Dec. 15, 2020

(54) INTELLIGENT WEB BROWSER SEGREGATION

(71) Applicant: Microsoft Technology Licensing, LLC, Redmond, WA (US)

(72) Inventor: Felix Gerard Torquil Ifor Andrew, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/431,104

(22) Filed: Jun. 4, 2019

(51) Int. Cl.
  *G06F 3/0483* (2013.01)
  *G06F 3/0484* (2013.01)
  *G06N 20/00* (2019.01)
  *H04L 29/08* (2006.01)

(52) U.S. Cl.
  CPC ........ *G06F 3/0483* (2013.01); *G06F 3/04845* (2013.01); *G06N 20/00* (2019.01); *H04L 67/02* (2013.01)

(58) Field of Classification Search
  CPC ... G06F 3/0483; G06F 3/04845; H04L 67/02; G06N 20/00
  See application file for complete search history.

(56) References Cited

U.S. PATENT DOCUMENTS

| | | | |
|---|---|---|---|
| 9,195,372 B2 | 11/2015 | Singh | |
| 9,881,096 B1 | 1/2018 | Warr et al. | |
| 10,025,702 B1* | 7/2018 | Karppanen | G06F 16/9574 |
| 2008/0005686 A1* | 1/2008 | Singh | G06F 3/04842 |
| | | | 715/764 |
| 2008/0046568 A1* | 2/2008 | Broda | H04L 67/14 |
| | | | 709/227 |
| 2012/0066628 A1* | 3/2012 | Ens | G06F 16/9577 |
| | | | 715/769 |
| 2012/0271941 A1* | 10/2012 | Mirandette | H04L 67/22 |
| | | | 709/224 |
| 2015/0215398 A1* | 7/2015 | Chang | G06F 16/957 |
| | | | 726/8 |
| 2016/0078011 A1 | 3/2016 | Arutyunyan | |

(Continued)

FOREIGN PATENT DOCUMENTS

KR  20170000329 A  1/2017

OTHER PUBLICATIONS

"The Great Suspender", Retrieved from: https://chrome.google.com/webstore/detail/the-great-suspender/bibkeccnjlkjkiokjodocebajanakg?hl=en, Dec. 27, 2015, 1 Page.

(Continued)

*Primary Examiner* — Matthew Ell

(57) ABSTRACT

In non-limiting examples of the present disclosure, systems, methods and devices for segregating web browser instances are provided. A first web browser application instance may be opened. An application instance may comprise at least an application opening a new application window for displaying content. A plurality of webpages may be browsed in a plurality of tabs in the first web browser application instance. An indication to browse to a new webpage that is not one of the plurality of webpages may be received. A determination may be made that the received indication is a browser-change event. A second web browser application instance may be opened. Content corresponding to the new webpage may be surfaced in the second web browser application instance.

18 Claims, 11 Drawing Sheets

(56) References Cited

U.S. PATENT DOCUMENTS

| | | | |
|---|---|---|---|
| 2016/0139750 A1* | 5/2016 | Barrus | G06F 3/0483 |
| | | | 715/777 |
| 2016/0164946 A1* | 6/2016 | Bazzi | G06F 21/53 |
| | | | 709/219 |
| 2017/0083487 A1* | 3/2017 | Wang | G06F 3/1454 |
| 2017/0199638 A1 | 7/2017 | Bhupatiraju et al. | |

OTHER PUBLICATIONS

Brinkmann, Martin, "Chrome Annoyance: new tabs not added to tab bar anymore", Retreived from: https://www.ghacks.net/2017/01/18/chrome-annoyance-new-tabs-not-added-to-tab-bar-anymore/, Jan. 18, 2017, 4 Pages.

Elliott, Matt, "Cap on the number of tabs you can have open in Chrome", Retreived from: https://www.cnet.com/how-to/put-a-cap-on-the-number-of-tabs-you-can-have-open-in-chrome/, Apr. 7, 2014, 3 Pages.

Francis, Dinsan, "Chrome to Get "Tab Groups" to Organize Tabs Better", Retreived from: https://www.chromestory.com/2018/11/how-to-enable-tab-groups-in-chrome/, Nov. 20, 2018, 6 Pages.

Holt, Kris, "Firefox has a new side-by-side tab feature for multitaskers", Retreived from: https://www.engadget.com/2018/06/05/firefox-tabs-color-picker-plugin-experiment/, Jun. 5, 2018, 9 Pages.

Roberts, David, "I have 227 browser tabs open, and my computer runs fine. Here's my secret", Retreived from: https://www.vox.com/2015/6/1/8695555/browser-tabs, Nov. 27, 2015, 6 Pages.

Surur, "This is how Tab Grouping will work on Google Chrome", Retreived from https://mspoweruser.com/this-is-how-tab-grouping-will-work-on-google-chrome/, 17 Pages.

\* cited by examiner

INTELLIGENT WEB BROWSER SEGREGATION

BACKGROUND

Users spend an ever-increasing amount of time utilizing their web browser applications. It is not uncommon for users to have a single web browser application instance open in which they have tabs open for work activities, shopping activities, planning activities, etc. Having a significant number of tabs open that are directed to various categories and that were opened at various times can be contextually frustrating for users and makes the resumption of tasks more difficult and time consuming.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for segregating web browser instances. In some examples, a new web browser application instance may be opened if there has been a significant duration of time that has elapsed since a user last interacted with a browser. In other examples, a new web browser application instance may be opened if a domain of a new webpage is not the same as a majority of existing open webpages. In additional examples, a new web browser application instance may be opened if "characteristics" of a new webpage do not substantially match the characteristics of one or more existing webpages in an open browser instance. In still other examples, a new web browser application instance may be opened if a selection of a link from an application that is not a web browser application is received. Additional examples described herein provide mechanisms for automatically categorizing webpages in a web browser application instance. Thus, when a tab corresponding to one of those webpages is removed from a group of tabs (e.g., dragged out), one or more additional tabs from the tab group that are determined to have similar content as the removed tab may be surfaced along with the removed tab in a new web browser application instance. In additional examples, users may resume a web browser application instance that was open on a first device, when they access a second device that is linked to a same user account.

BRIEF DESCRIPTION OF THE DRAWINGS

Non-limiting and non-exhaustive examples are described with reference to the following figures.

DETAILED DESCRIPTION

Figure 1:
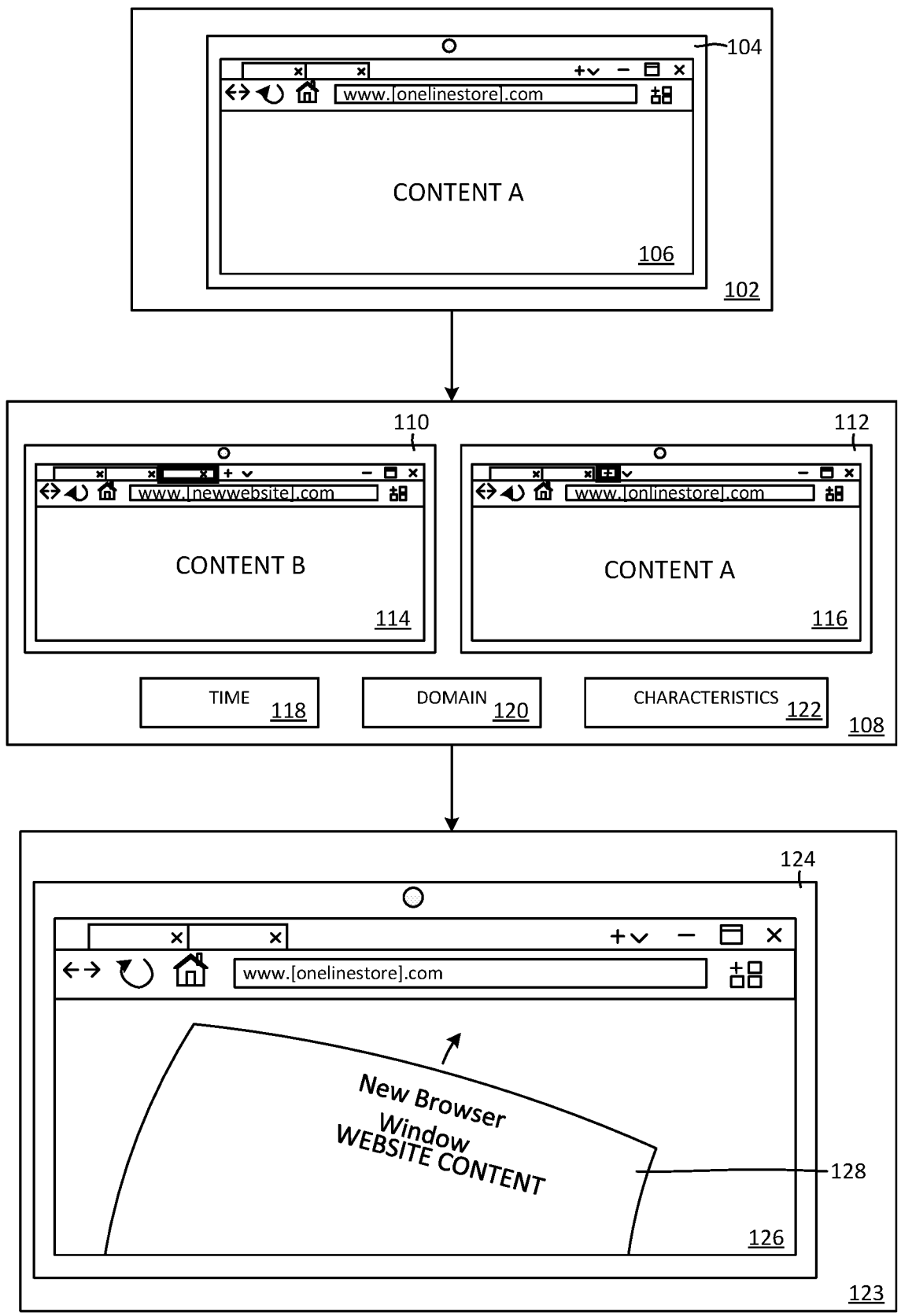
FIG. 1 is a schematic diagram illustrating an example distributed computing environment for segregating web browser instances based on browser change events.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for opening new web browser application instances based on various indicators. As used herein an "application instance" comprises at least an application opening a new application window for displaying content. The indicators that are utilized to determine whether a new web browser application instance will be opened are sometimes referred to herein as "browser-change events".

According to examples, a browser-change event may comprise a duration of time between a time that a previous tab was opened, and a new webpage is selected and/or a new tab is added to a browser instance. In additional examples, a browser-change event may comprise a duration of time between a time that an operation associated with a webpage in a previously opened tab was executed and/or completed and a new webpage is selected and/or a new tab is added to a browser instance. In other examples, a browser-change event may comprise opening of a new webpage that is substantially different from one or more webpages in one or more previously-opened tabs. The similarity between webpages may be determined based on analysis of webpage domains and/or the web content of a webpage (e.g., HTML tags, machine learning classification, etc.). In still other examples, a browser-change event may comprise selection of a webpage link from an application that is not a web browser application.

Any of the above browser-change events may cause a tab and/or webpage corresponding to the browser-change event to be opened in a new web browser application instance. For example, if a first web browser application is open with four tabs active in it, and one of the above-described browser-change events is determined to have occurred (e.g., a new tab is added and a website entered in that tab relates to a substantially different content type than the webpages in the previously-existing tabs; a webpage link is selected from an email application; etc.), a new web browser application instance may be opened and the new tab/webpage may be surfaced in that new browser instance.

The systems, methods, and devices described herein provide technical advantages for completing tasks in a web browser application. Processing costs (i.e., CPU cycles) are reduced via the mechanisms described herein at least in that users do not have to manually review web content from multiple open tabs, rearrange those tabs into categories, and subsequently manually re-open the webpages corresponding to a subset of the one or more categories in additional browser instances. Rather, webpage content in various tabs can be automatically classified and grouped into categories based on domain and/or content characteristics that can be utilized to segregate tabs into one or more browser instances. Additionally, by providing mechanisms for pulling multiple tabs out of a tab group based on their similarity to a single tab, processing resources are further reduced. That is, if a user pulls a first tab out of a tab group for creating a new web browser application instance, additional tabs that contain similar subject matter may be automatically grouped with the tab that was pulled out and surfaced in a new web browser application instance. The mechanisms described herein are also beneficial in that they provide a more user-friendly way to accomplish tasks such that a user's attention can be focused on one project at a time rather than having tabs related to multiple activities open in a single browser instance.

FIG. 1 is a schematic diagram illustrating an example distributed computing environment 100 for segregating web browser instances based on browser change events. Computing environment 100 includes original browser instance sub-environment 102, browser change event sub-environment 108, and new browser sub-environment 123. All of the computing devices depicted in FIG. 1 are the same computing device at different times (e.g., after various web browser events have occurred).

Original browser instance sub-environment 102 includes computing device 104. A web browser application is open on computing device 104. The web browser application may be executed entirely on computing device 104, entirely one or more remote computing devices (e.g., in the cloud), and/or partially on computing device 104 and partially on one or more remote computing devices. In this example, a first web browser application instance 106 of the web browser application is open on computing device 104. According to examples, an application instance may comprise initiation and/or execution of an application in a single application window. Thus, a single instance of an application may be executed by a computing device or multiple instances of an application may be executed by a computing device (e.g., one or more web browser application windows may be open and/or executed at any given time by a computing device). In this specific example, the first web browser application instance includes two open tabs, with a current tab open to webpage: www.[onlinestore].com, and CONTENT A of that webpage being displayed by computing device 104.

Browser change event sub-environment 108 includes computing device 110, computing device 112, time browser change event element 118, domain browser change event element 120, and characteristics browser change event element 122. In this example, the illustration and description of computing device 110 relate to a first mechanism for initiating an opening of a new web browser in response to a first browser-change event, and the illustration and description of computing device 112 relate to a second mechanism for initiating an opening of a new web browser in response to a second browser-change event.

In some examples, the web browser application (or a service associated with the web browser application) may analyze web addresses that are open and/or that have been opened in a plurality of tabs of a web browser application instance and determine whether the domains included in those web addresses are the same or different and/or whether the domains relate to a same or different subject matter and/or category of information. In some examples, the categorization and/or comparison of domains in multiple tabs may be performed prior to the web browser application retrieving the web content corresponding to the web address that is input into a new tab. In other examples, the categorization and/or comparison of domains in multiple tabs may be performed subsequent to the web browser application retrieving the web content corresponding to the web address that is input into a new tab.

The web browser application may initiate and open a new web browser application instance if a determination is made that domains of webpages included in multiple tabs of a single browser instance are different and/or if domains of webpages included in multiple tabs of a single browser instance relate to different subject matter/categories of information. Thus, if a determination is made that a new tab is opened, and that a domain corresponding to a web address entered into the address bar of the browser in that tab relates to different subject matter than one or more other open tabs, the web browser application may cause the new tab to be opened and/or surfaced in a new web browser application instance. The categorization and surfacing of webpage information via domain processing is illustrated by domain browser-change event element 120.

In additional examples, the web browser application may analyze web content in each of a plurality of tabs of a web browser application instance and determine whether that content and/or characteristics of that content relate to same or different subject matter and/or a same or different category of information. In some examples, the web browser application may determine the subject matter and/or a category associated with web content on a webpage based on analyzing one or more headings and/or one or more tags embedded in the HTML instructions of the webpage. In other examples, the web browser application may determine the subject matter and/or category associated with the web content on a webpage based on a language mapping of text and/or other natural language (e.g., video, audio) included on a webpage to one or more content type categories. In still additional examples, the web browser application may determine the subject matter and/or category associated with the web content on a webpage based on application of one or more machine learning models, which have been trained to identify web content type, to the web content. A combination of one or more of these mechanisms may also be used to determine the subject matter and/or category of webpage content.

The web browser application may initiate and open a new web browser application instance if a determination is made that content of webpages included in multiple tabs of a single browser instance are different and/or if content of webpages included in multiple tabs of a single browser instance relate to different subject matter/categories of information. Thus, if a determination is made that a new tab is opened, and that web content corresponding to a web address entered into the address bar of the browser in that tab relates to different subject matter than one or more other open tabs, the web browser application may cause the new tab to be opened and/or surfaced in a new web browser application instance. The categorization and surfacing of web content based on these mechanisms is illustrated by characteristic browser-change event element 122.

In other examples, if one or more tabs are open in a web browser application instance, an indication to open a new tab in that web browser application instance is received, and a threshold duration of time elapses between a time that a previous tab was opened and the indication to open the new tab was received, the web browser application may cause the new tab to be opened and/or surfaced in a new web browser application instance. For example, if a tab is opened in a web browser application instance at 4:30 pm on a user's work computer before she goes home for the evening, that user does not close the web browser application instance, and she returns to the computer the next morning and opens a new tab in the web browser application instance, that tab may be moved to a new web browser application instance based on a threshold duration of time elapsing between the last tab being opened and the new tab being opened. In additional examples, if one or more tabs are open in a web browser application instance, an indication to open a new tab in that web browser application is received, and a threshold duration of time elapses between a time that a web operation associated with a webpage in an open tab was received and/or executed, the web browser application may cause the new tab to be opened and/or surfaced in a new web browser application instance. These mechanisms are illustrated in relation to time browser-change event element 118.

Computing device 110 continues to display the first web browser application instance 106 (referred to as first web browser application instance transition 114 in relation to computing device 110). However, a new tab has been added to the first web browser application instance 106 and there are now three tabs in that instance. A new webpage address has also been entered into the navigation bar of the first web browser application instance transition 114 (i.e., www.[newwebsite].com) and/or the new webpage corresponding to that address has been navigated to by that instance.

Computing device 112 continues to display the first web browser application instance 106 (referred to as first web browser application instance transition 116 in relation to computing device 112). However, an indication to add a new tab to the two existing tabs of that instance has been received (e.g., a selection of the plus user interface element next to the two previously-opened tabs). In examples, the new tab may not be opened in first web browser application instance transition 116, because a change event corresponding to time browser change event element 118 is detected. In other examples, the new tab may be opened in first web browser application instance transition 116 and a subsequent prompt may be surfaced that is selectable for opening the new tab in a different browser instance or maintaining the tab in the current browser instance.

New browser sub-environment 123 includes computing device 124, which illustrates the result of each of the new browser instance mechanisms described above with reference to computing device 110 and computing device 112. Specifically, when the web browser application change-event occurs, the web browser application may cause a new web browser application instance corresponding to the action and/or new web content related to the browser application change-event to be surfaced. Thus, new browser instance 128 is surfaced over previously existing browser instance 126. In relation to the browser-change event illustrated by computing device 110, new browser instance 128 may be surfaced with a tab displaying the content from www.[newwebsite].com. In relation to the browser-change event illustrated by computing device 112, new browser instance 128 may be surfaced with a tab displaying a blank tab/web browser instance shell because the browser-change event was simply selection of a new tab, and not the addition of a web address to a web address bar and/or a new webpage request.

Figure 2:
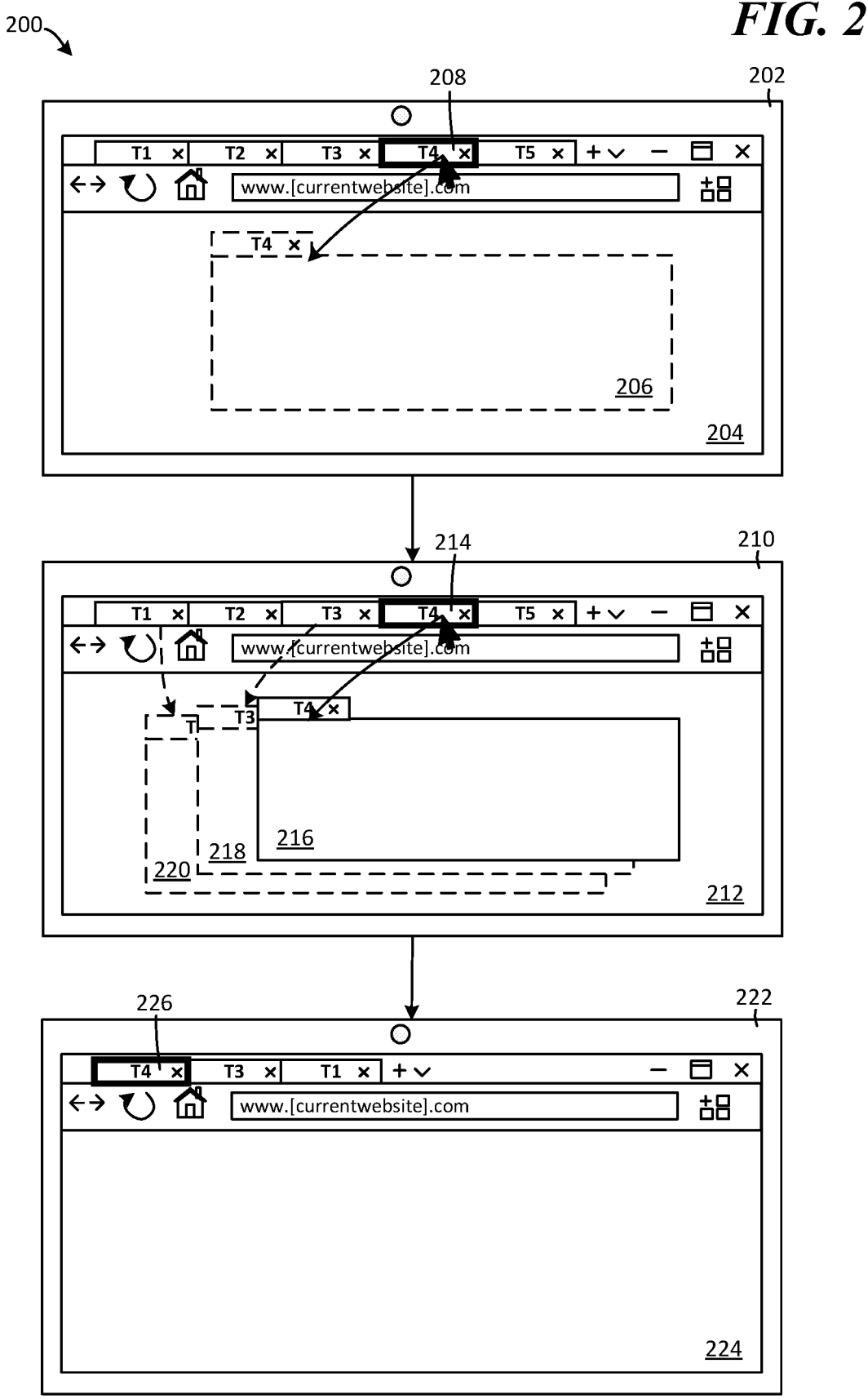
FIG. 2 is another schematic diagram illustrating an example distributed computing environment for segregating web browser instances and aggregating tabs for segmentation into a new web browser based on webpage classification.

FIG. 2 is another schematic diagram illustrating an example distributed computing environment 200 for segregating web browser instances and aggregating tabs for segmentation into a new web browser based on webpage classification. For ease of illustration, computing environment 200 depicts three computing devices (computing device 202, computing device 210, and computing device 222). However, those computing devices are the same computing device at different stages of the tab segregation mechanisms described in relation to FIG. 2.

Computing device 202 displays a first web browser application instance 204. There are five open tabs (T1, T2, T3, T4, T5) in application instance 204. In this example, the currently active tab is tab 4 208, with the content accessed/displayed in that tab being content from www.[currentwebsite].com. In this example, a user may determine that the content in the first web browser application instance 204 should be split between two different browser instances. For example, a user may determine that characteristics of at least one tab are sufficiently different from characteristics of one or more other tabs in first web browser application instance 204, that it would be more user friendly to browse that subject matter in separate browser instances.

In this example, tab 4 208 is pulled out of the tab bar that includes the rest of the tabs in the first web browser application instance 204. A click and drag mechanism may be utilized, a touch gesture to drag the tab out may be utilized, etc. This is indicated by the arrow between tab 4 208 and tab 4 overlay element 206. According to examples, when a tab is pulled out from a group of tabs in a web browser application instance, the web browser application, or a service associated with the web browser application, may analyze the domains of one or more other open tabs of a web browser instance, and/or the web content corresponding to those domains, and determine whether the characteristics and/or classification of that data relates to characteristics and/or classification of data included in the domain and/or web content corresponding to the tab that was pulled out. If the characteristics and/or classification of data associated with one or more other tabs is determined to meet a minimum threshold likelihood of relating to the characteristics and/or classification of data associated with the tab that was pulled out, the tab that was pulled out and the one or more tabs that have characteristics and/or classification that meet that threshold may be surfaced in a new web browser application instance. Thus, in this example, the characteristics and/or classification of the domain and/or web content of tab 1 and tab 3 are determined to relate to a sufficient degree (i.e., a value above a specified threshold) to the characteristics and/or classification of the domain and/or web content of tab 4 208/214. Thus, as illustrated on computing device 210, when tab 4 213 is pulled out from the tab bar of the first web browser application instance 212, tab 1 and tab 2 are also pulled out as illustrated by tab 1 overlay element 220, tab 3 overlay element 218 and tab 4 overlay element 216. As illustrated by computing device 222, a second web browser application instance 224 is then surfaced with the tabs that have been pulled out (tab 4 208/214/226 has been manually pulled out and tab 2 and tab 3 have been automatically pulled out because of their corresponding domains/characteristics) being included in that application instance.

Figure 3:
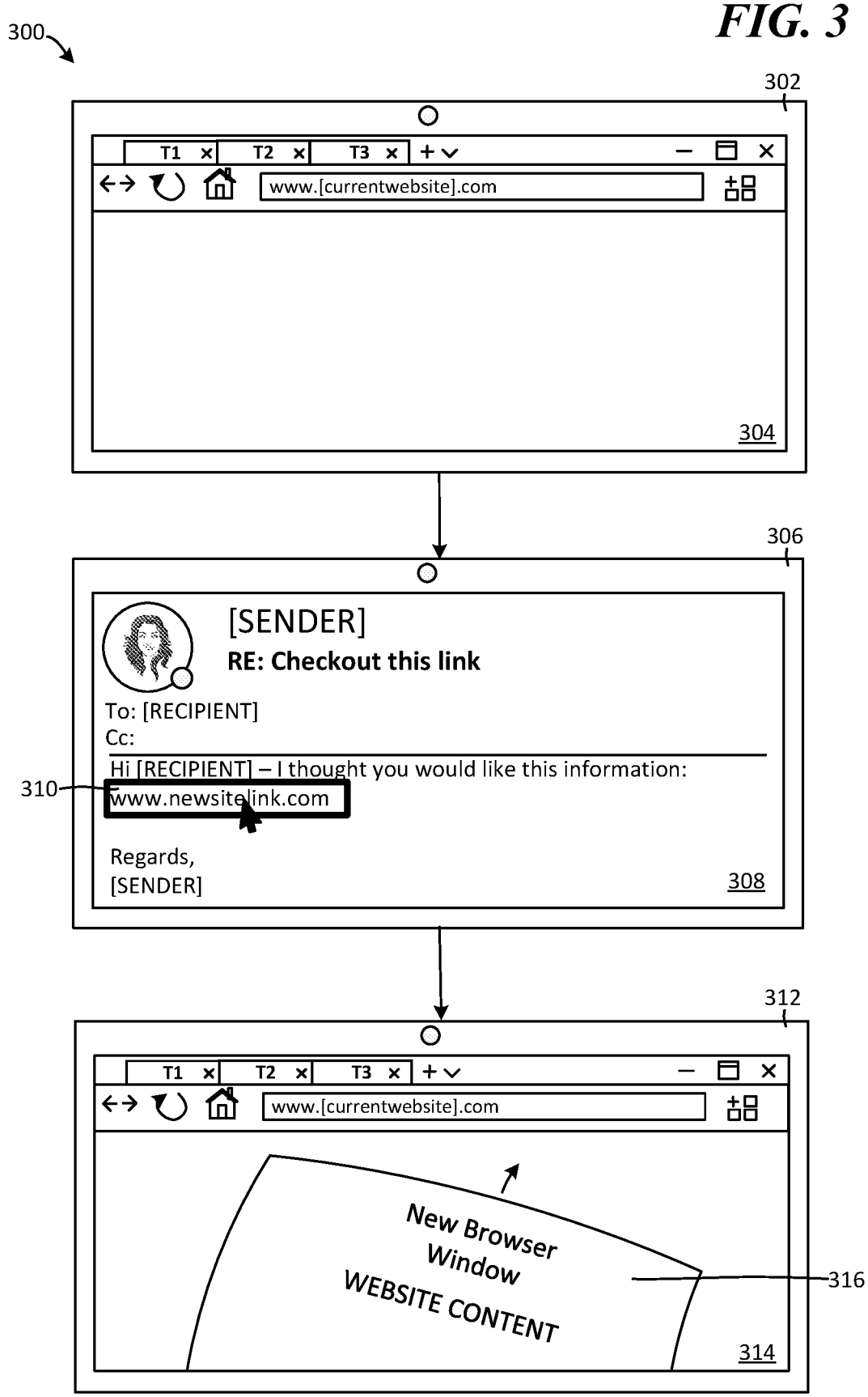
FIG. 3 is another schematic diagram illustrating an example distributed computing environment for segregating web browser instances based on receiving selection of a webpage link from a different application.

FIG. 3 is another schematic diagram illustrating an example distributed computing environment 300 for segregating web browser application instances based on receiving selection of a webpage link from a different application. For ease of illustration, computing environment 300 depicts three computing devices (computing device 302, computing device 306, and computing device 312). However, those computing devices are the same computing device at different stages of the tab segregation mechanisms described in relation to FIG. 3.

Computing device 302 displays a first web browser application instance 304, which has three open tabs (T1, T2, T3). In this example the current open tab of the first web browser application instance on computing device 302 displays content for www.[currentwebsite].com.

Computing device 306 displays an email application. Specifically, an email that the user of computing device 302/306/312 has received is displayed. The subject line of that email is "RE: Checkout this link", which has been sent by [SENDER] to [RECIPIENT], and the body of that email reads: "Hi [RECIPIENT]—I thought you would like this information: www.newsitelink.com—Regards, [SENDER]". The email application instance that includes that email may be open concurrently with the first web browser application instance 304 (e.g., the browser application instance may be hidden behind the email instance, the browser application instance may be minimized).

In this example, a selection of the link 310 corresponding to www.newsitelink.com in the body of the email is received (e.g., a user may click on link 310, a verbal command to open link 310 may be received, etc.). In some examples, when that interaction is detected, a determination may be made by the web browser application (or a service associated with the web browser application) as to whether characteristics associated with the domain of link 310 and/or the web content corresponding to link 310 are substantially similar to the tabs that are open in the first web browser application instance 304. In such examples, if a determination is made that those characteristics are substantially similar, a new tab corresponding to link 310 may be opened in the first web browser application instance 304.

In other examples, the web browser application may not make any determination regarding the characteristics of the linked webpage content and the domain/web content of the first browser instance, but rather, simply open a new browser instance when a link is selected. Such an example is illustrated in FIG. 3. Thus, when link 310 is selected in first web browser application instance 308 on computing device 306, a new/second web browser application instance 316 is surfaced on that computing device (illustrated on computing device 312), which the content corresponding to the link 310 is surfaced in.

Figure 4:
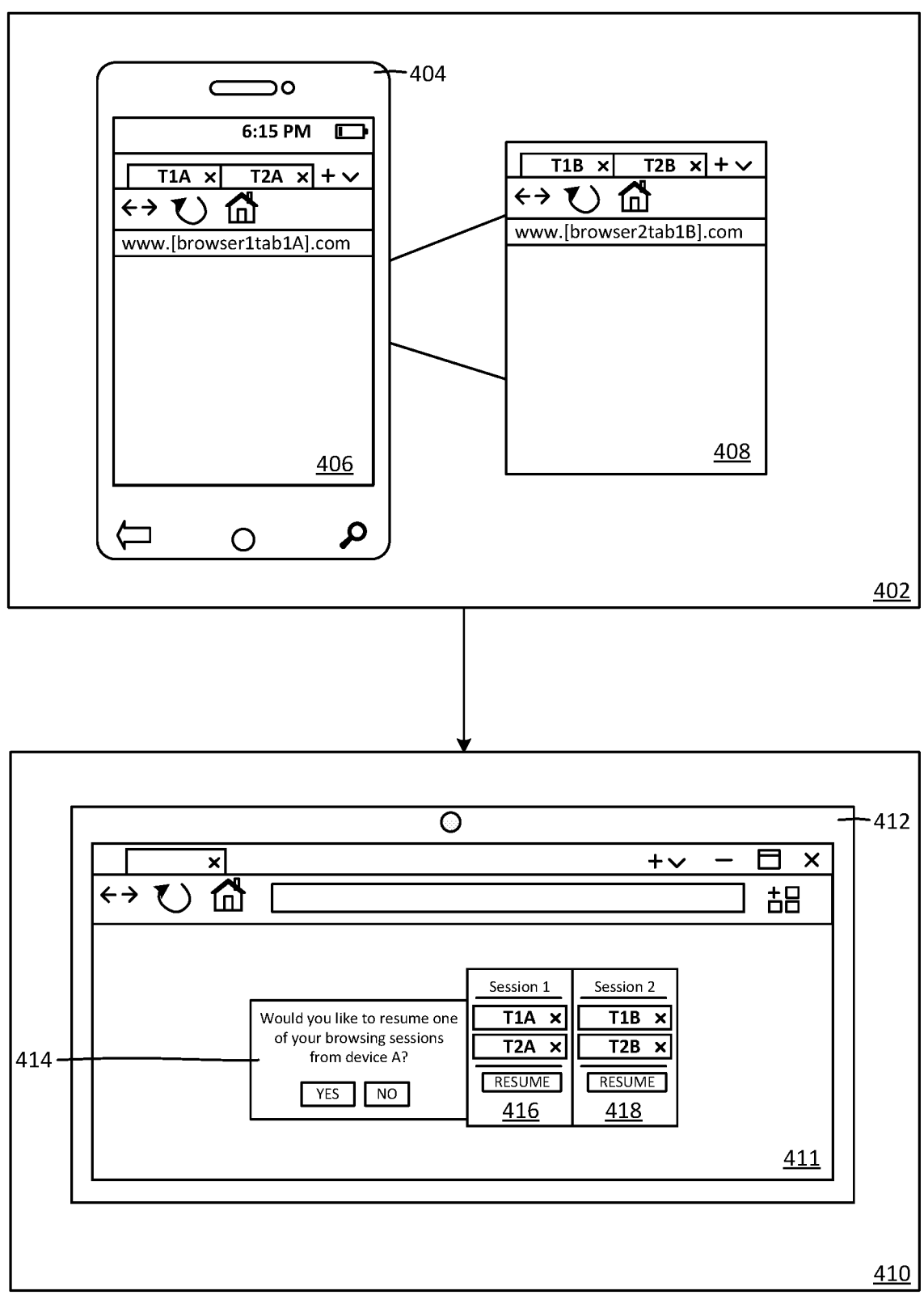
FIG. 4 is another schematic diagram illustrating an example distributed computing environment for initiating the surfacing of an entire group of browser tabs and their corresponding webpages in a saved application state from a browsing instance on a different device via a single action input.

FIG. 4 is another schematic diagram illustrating an example distributed computing environment 400 for initiating the surfacing of an entire group of browser tabs and their corresponding webpages in a saved application state from a browsing instance on a different device via a single action input. Distributed computing environment 400 includes first device sub-environment 402 and second device sub-environment 410.

First device sub-environment 402 includes mobile computing device 404, which is currently displaying a first web browser application instance 406. First web browser application instance 406 has two tabs open (T1A, T2A), with a current tab that is being displayed open to the webpage www.[browser1tab1A].com. A second web browser application instance 408, which is not currently displayed by mobile computing device 404, but which is still open on mobile computing device 404 (e.g., open behind web browser application instance 406) is also included in first device sub-environment 402. Second web browser application instance 408 also has two tabs included in it. Those tabs are tab T1B and T2B.

Second device sub-environment 410 includes computing device 412. A user may be associated with multiple devices (e.g., mobile computing device 404 and computing device 412). For example, a user may utilize a same user account to sign into an operating system and/or one or more applications associated with multiple devices. In this example, a same user account is associated at least with the browser application being executed on both of mobile computing device 404 and computing device 412.

As illustrated in this example, a web browser application instance that is/was open on a first device may be resumed in its previous state from one or more other devices. Thus, in this example, when the web browser application user interface 411 is opened on computing device 412, and the same user account is logged into computing device 412 as was logged in when first web browser application instance 406 was open, a selectable option 414 to resume one or more previous web browser application instances from the user's other devices may be surfaced. In this example, selectable option 414 is surfaced over the web browser application user interface 404 on computing device 412, and selectable option 414 states: "Would you like to resume one of your browsing sessions from device A?" "Yes" "No". Additionally, if a user selects the "Yes" element, selectable options for resuming the previously open web browser application instances from computing device 404 may be surfaced. In this example, session 1 selectable element 416 may be selected for resuming the first web browser application instance 406 from mobile computing device 404, and session 2 selectable element 418 may be selected for resuming the second web browser application instance 408 from mobile computing device 404. Thus, either/both of the browsing instances that were accessed on mobile computing device 404 may be resumed from their previous state (e.g., with the same tabs and/or content open) in the web browser application from other computing devices that a same user account is logged into.

Figure 5A:
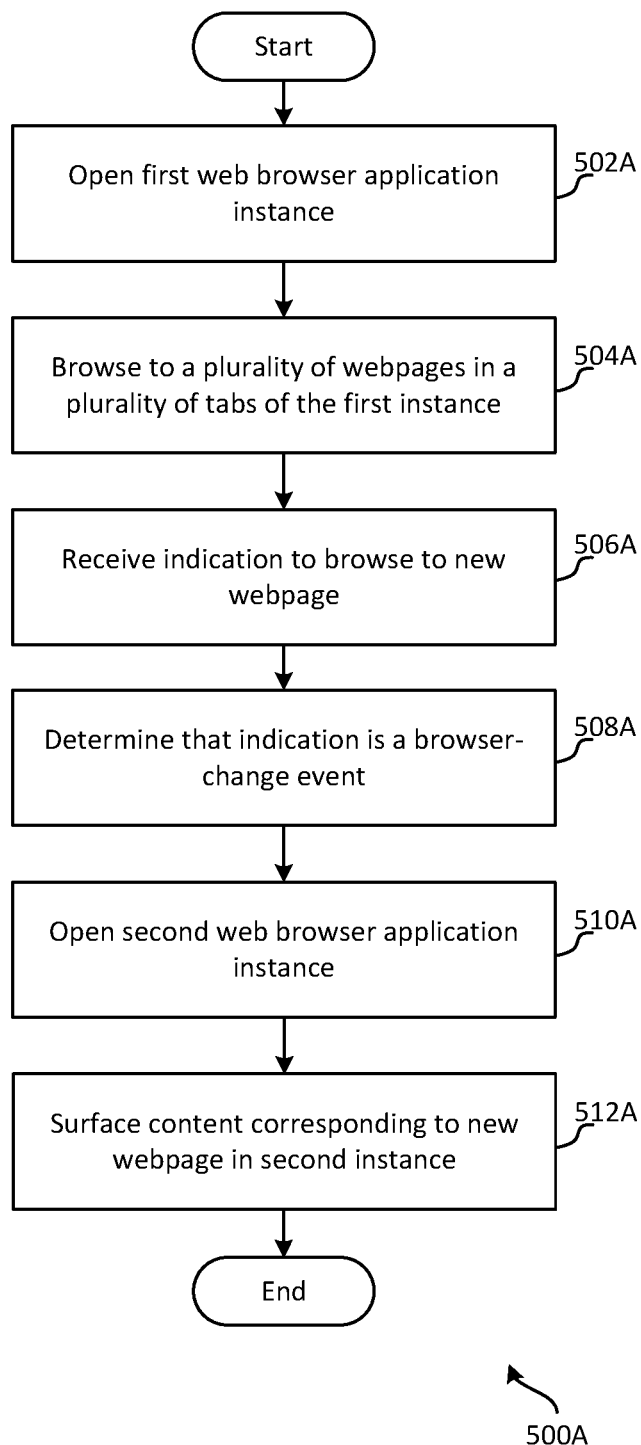
FIG. 5A is an exemplary method for segregating web browser instances based on browser change events.

FIG. 5A is an exemplary method 500A for segregating web browser instances based on browser change events. The method 500A begins at a start operation and flow continues to operation 502A.

At operation 502A a first web browser application instance is opened. As used herein, an application instance comprises at least an application opening a new application window for displaying content.

From operation 502A flow continues to operation 504A where a plurality of webpages is browsed in a plurality of tabs in the first web browser application instance. For example, a first tab of the plurality of tabs may have a first webpage that is open in it, a second tab of the plurality of tabs may have a second webpage that is open in it, etc.

From operation 504A flow continues to operation 506A where an indication to browse to a new webpage that is not one of the plurality of webpages is received. In some examples, the indication may comprise the opening of a new tab in the tab bar that contains the plurality of tabs. In other examples, the indication may comprise the opening of a new tab in the tab bar that contains the plurality of tabs in addition to adding a web address in the web address bar of the new tab. In still other examples, the indication may also comprise the navigation and/or the command to navigate to the web address that has been added to the web address bar of the new tab. In additional examples, the indication may comprise the selection of a webpage link from an application that is not the web browser application.

From operation 506A flow continues to operation 508A where a determination that the received indication is a browser-change event is made. In some examples, the determination may be made based on the domain of the plurality of tabs in the tab bar of the first browser instance being different than a domain included in the new tab. In other examples, the determination may be made based on the content of the webpages corresponding to the plurality of tabs in the tab bar being substantially different than the content corresponding to a webpage that is being navigated to in the new tab. That is, in some examples, content of each webpage in each tab may be categorized and a score may be calculated that corresponds to the content of the new tab webpage content being similar/dissimilar to content of one or more webpages corresponding to the previously existing tabs. In other examples, the determination may be made based on the opening, after a threshold duration of time, of a new tab after a last tab of the plurality of tabs was added. In some examples, the determination may be made based on the opening of a new tab, after a threshold duration of time, after a last operation in a last tab of the plurality of tabs was executed and/or completed. In still other examples, the determination may be made based on the received indication being selection of a webpage link from an application that is not the web browser application.

From operation 508A flow continues to operation 510A where a second web browser application instance is opened, and from operation 510A flow continues to operation 512A where content corresponding to the new webpage is surfaced in the second web browser application instance.

From operation 512A flow moves to an end operation and the method 500A ends.

Figure 5B:
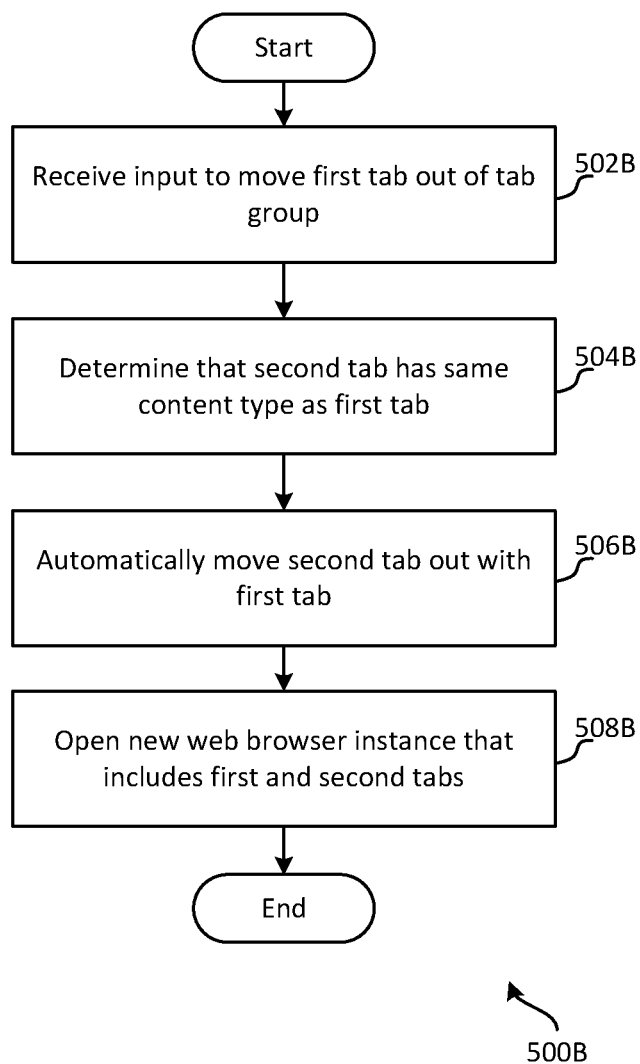
FIG. 5B is an exemplary method for automatically associating a plurality of tabs with a tab that has been removed from a tab group and opening a new web browser application instance with each of those tabs.

FIG. 5B is an exemplary method 500B for automatically associating a plurality of tabs with a tab that has been removed from a tab group and opening a new web browser application instance with each of those tabs included in it. The method 500B begins at a start operation and flow moves to operation 502B.

At operation 502B an input to move a first tab out of a group of tabs in a first web browser application instance is received. For example, there may be a plurality of tabs open in the first web browser application instance, with each of those tabs containing content corresponding to a navigated-to webpage. An input to move the first tab may comprise, for example, a drag and drop of the tab from the tab group, a touch and drop from the tab group, a verbal command, etc.

From operation 502B flow continues to operation 504B where a determination is made that at least a second tab has a same or similar content type as the first tab. By same or similar, it should be understood that a minimum threshold value corresponding to a similarity must be reached. It is at least a second tab because there may be more than one tab that has a same or similar content type as the first tab. The similarity of the content type may be determined based on analysis of domains of webpages of the tabs, analysis of HTML headings and/or tags, and/or application of one or more machine learning models that have been trained to identify content types to the webpages.

From operation 504B flow continues to operation 506B where the second tab is automatically moved out of the tab group with the first tab. Any other tabs that were determined to also have a same or similar content type as the first tab may also be moved out of the tab group with the first and second tabs.

From operation 506B flow continues to operation 508B where a new browser instance is opened that includes the first and second tabs. Any other tabs that were determined to also have a same or similar content type as the first tab may also be opened in the new browser instance with the first and second tabs. The new browser instance may be surfaced in a window over the first browser instance. That is in some examples, the first browser instance may remain open, but hidden, when the new browser instance is opened.

From operation 508B flow moves to an end operation and the method 500B ends.

Figure 5C:
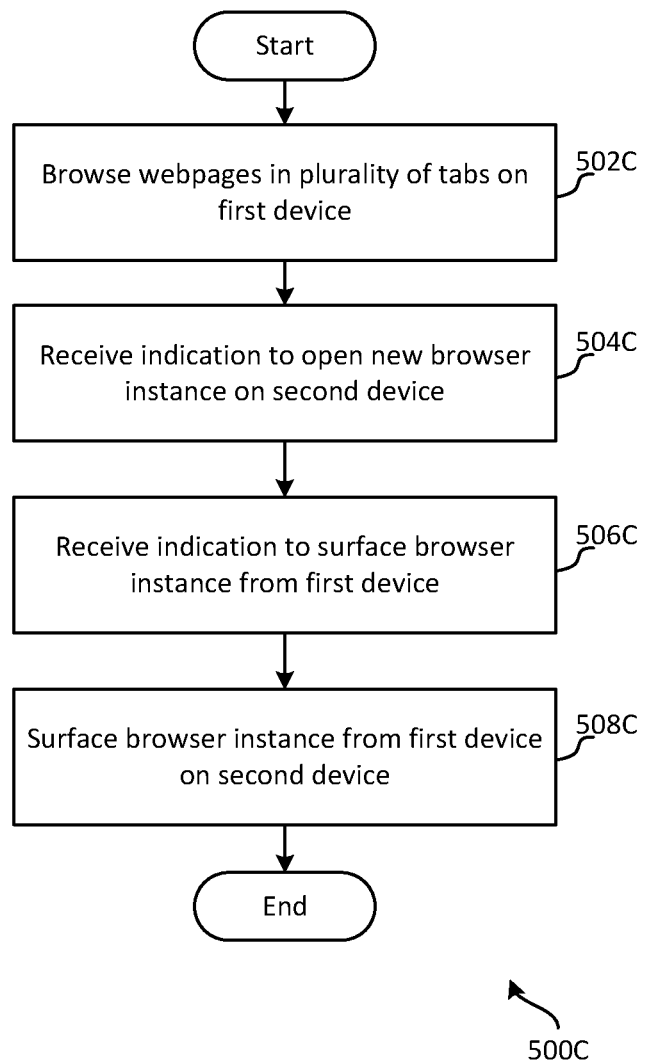
FIG. 5C is an exemplary method for surfacing a previously opened web browser application instance in a saved state from a first device on a second device.

FIG. 5C is an exemplary method 500C for surfacing a previously opened web browser application instance in a saved state from a first device on a second device. The method 500C begins at a start operation and flow moves to operation 502C.

At operation 502C webpages are browsed in a plurality of tabs in a first web browser application instance on a first computing device.

From operation 502C flow continues to operation 504C where an indication to open a new web browser instance on a second device is received. In some examples, the indication may comprise the opening of the web browser application on the second device. In other examples, the indication may comprise opening a new browser window in an already open web browser application on the second device. In some examples, the web browser application on the second device may be the same web browser application as the first application instance is open in. In other examples, the web browser application on the second device may be a different web browser application than the web browser application that the first web browser application instance is open in. For example, there may be an application add-in and/or extension that provides functionality described in relation to FIG. 502C.

From operation 504C flow continues to operation 506C where an indication to surface the first browser instance on the second device is received. In some examples, the indication may comprise the opening of the web browser application on the second computing device. In other examples, the indication may be an explicit selection of an option to surface the first browser instance from within a menu of the web browser application on the second device. If there are multiple web browser application instances that have not been closed on the first device there may be an option surfaced to select which of those instances should be surfaced on the second device.

From operation 506C flow continues to operation 508C where the tabs and corresponding webpages in the first browser instance are opened in the new browser instance on the second device in a state in which they were last in on the first computing device.

From operation 508C flow continues to an end operation and the method 500C ends.

Figure 6:
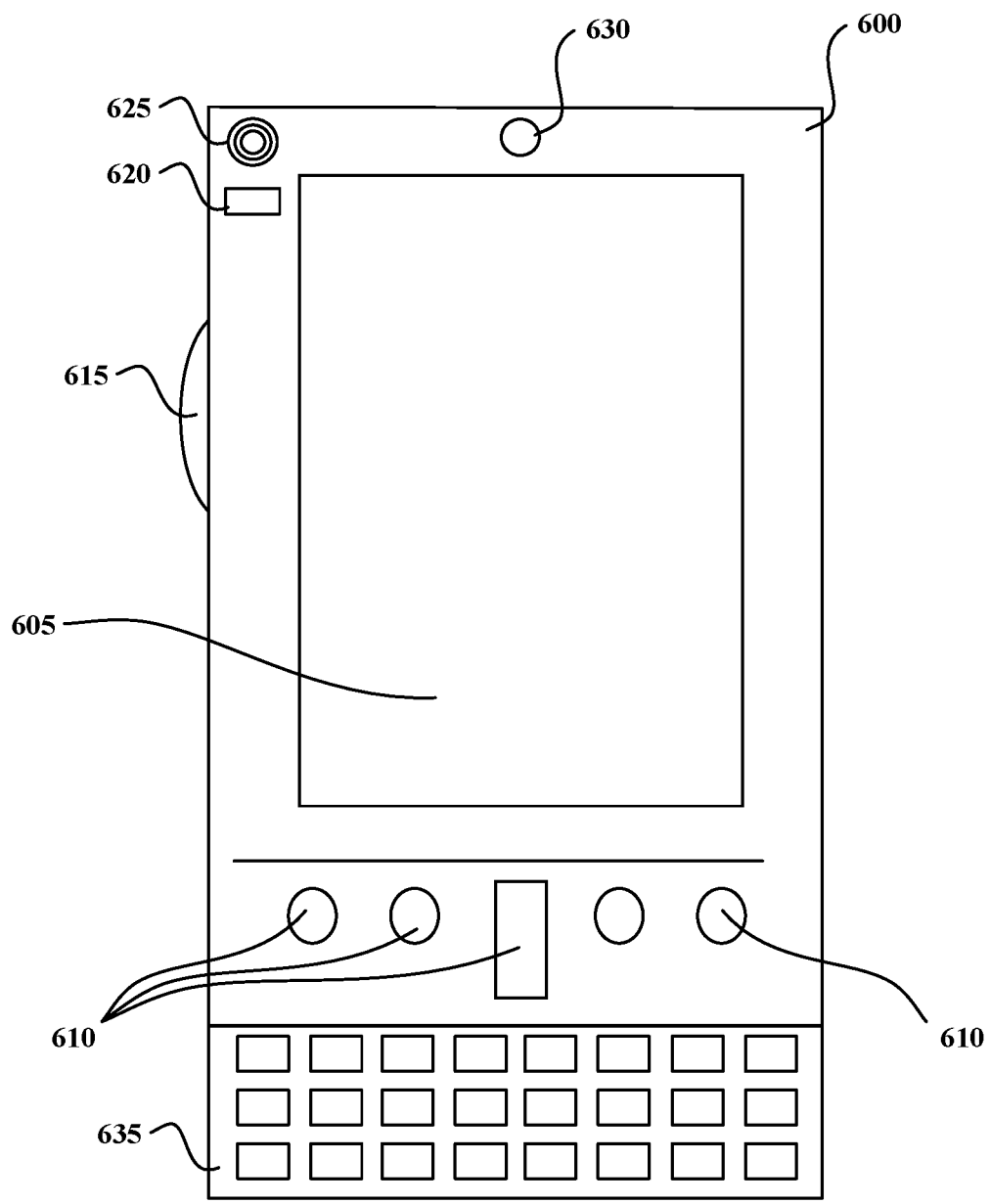
FIGS. 6 and 7 are simplified diagrams of a mobile computing device with which aspects of the disclosure may be practiced.
Figure 7:
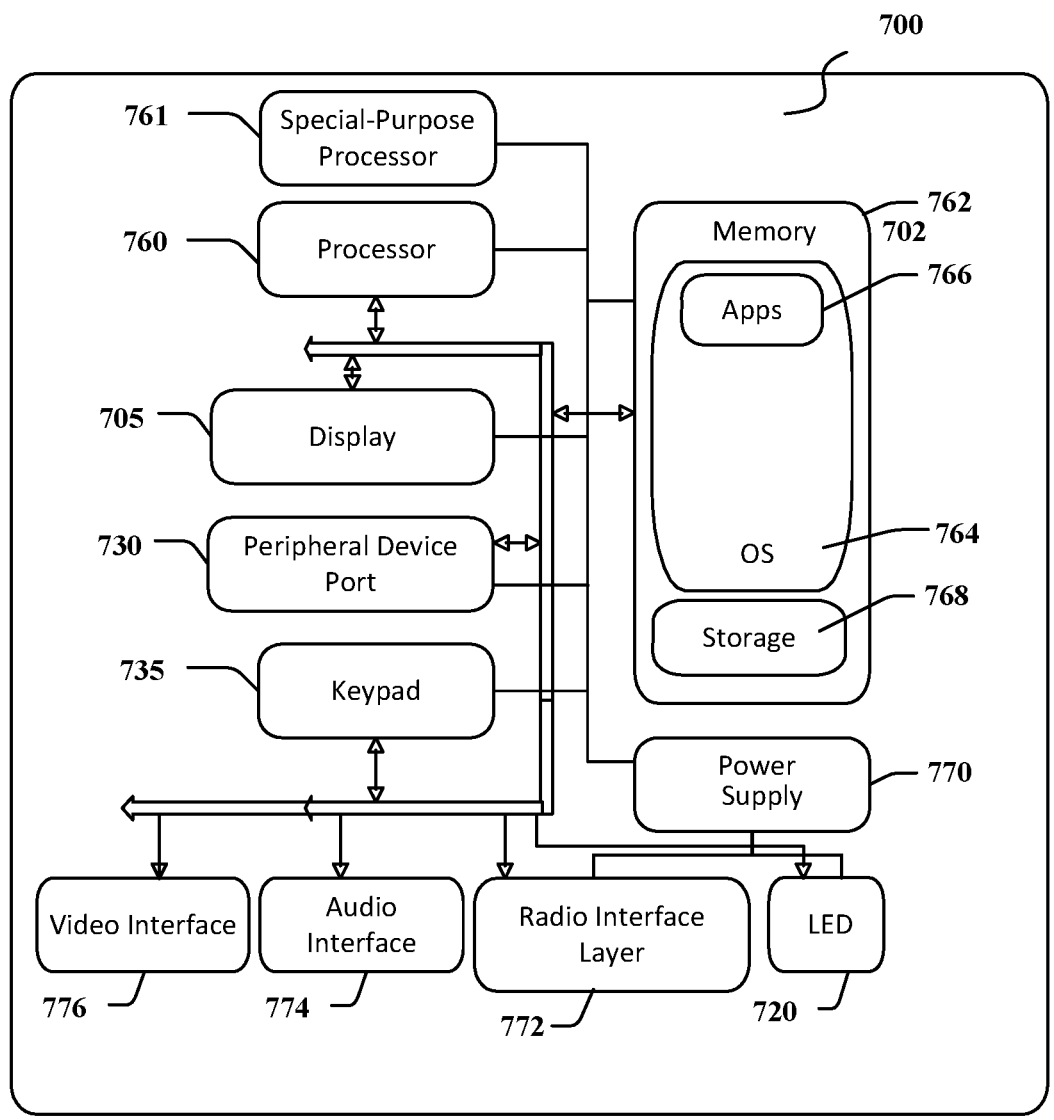

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a cross-device resources collaboration application.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/ information transfer and storage means, including electronic mail and collaborative data/information sharing systems.

Figure 8:
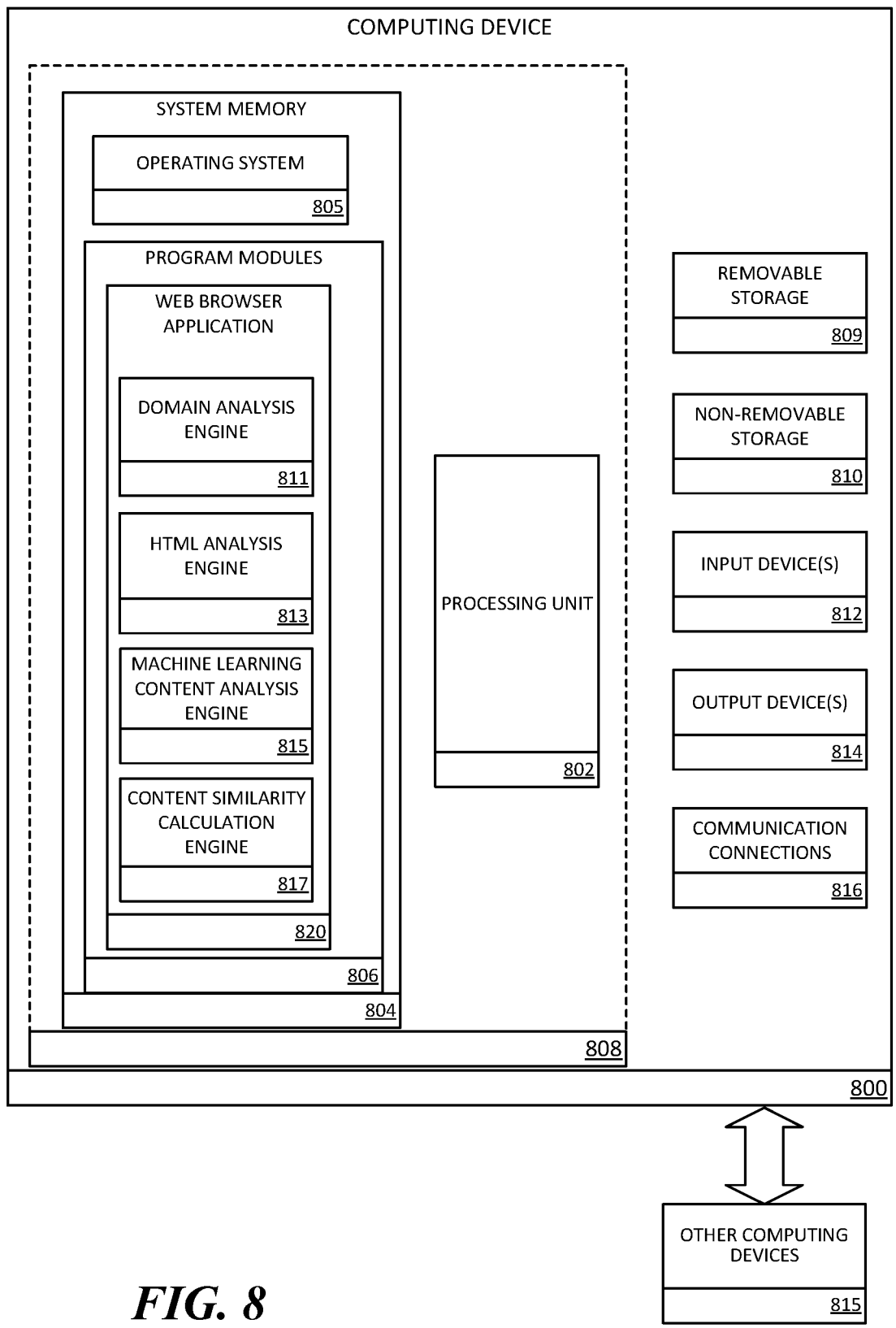
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with browser segregation. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more web browser applications and segregation components. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., web browser application 820) may perform processes including, but not limited to, the aspects, as described herein. According to examples, domain analysis engine 811 may perform one or more operations associated with analyzing the domains of webpages in open tabs and determining whether they are the same or different. HTML analysis engine 813 may perform one or more operations associated with analyzing headers and tags in webpages to determine a content type associated with those webpages. Machine learning content analysis engine 815 may perform one or more operations associated with applying one or more machine learning models that have been trained to classify webpages by content type to one or more webpages. Content similarity calculation engine 817 may perform one or more operations associated with calculating a similarity score for a webpage based on its content's similarity to one or more other webpages' content in a web browser application instance.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
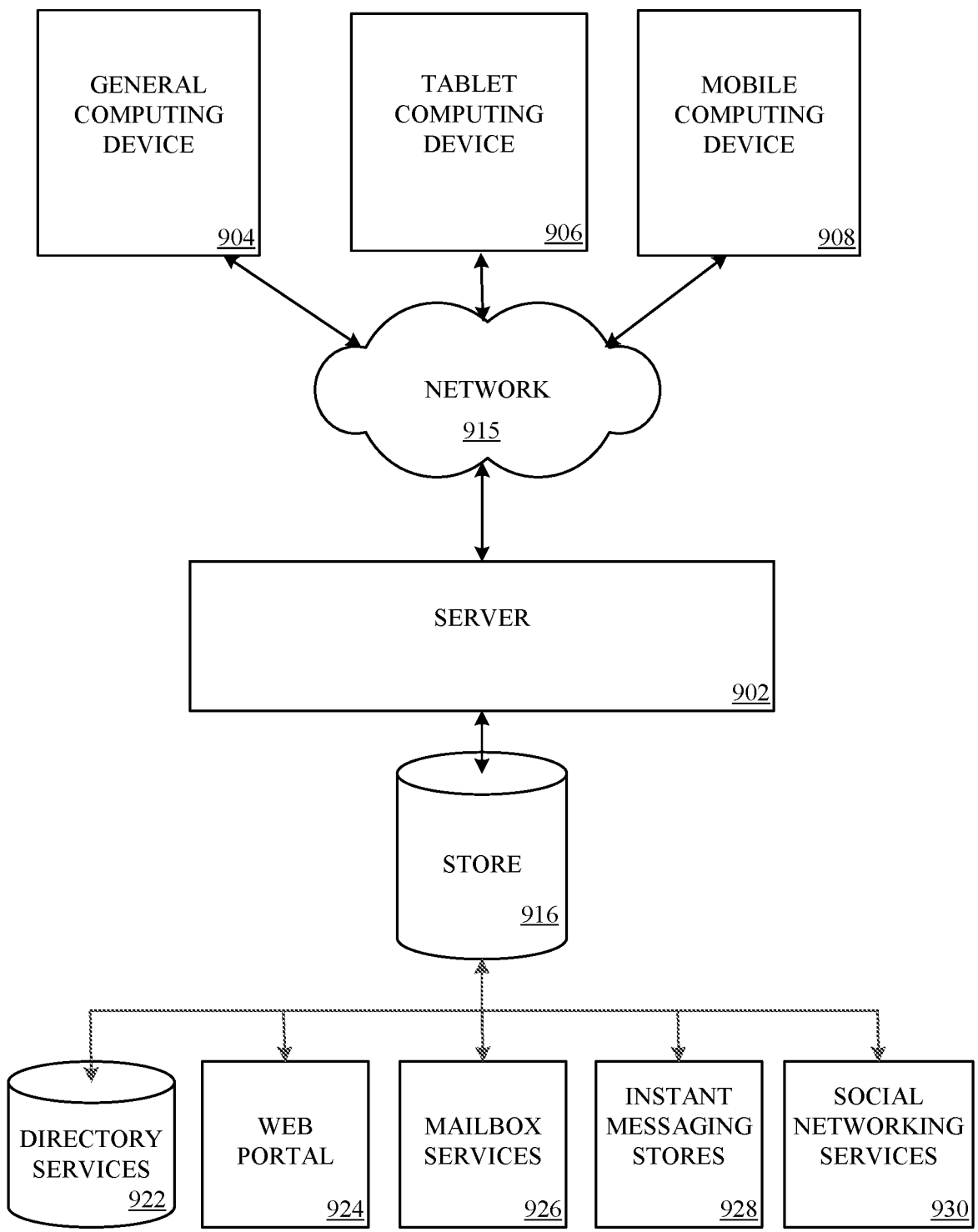
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for segregating web browser instances, comprising:
    a memory for storing executable program code; and
    one or more processors, functionally coupled to the memory, the one or more processors being responsive to computer-executable instructions contained in the program code and operative to:
        open a first web browser application instance, wherein an application instance comprises at least an application opening a new application window for displaying content;
        browse to a plurality of webpages, wherein the plurality of webpages is browsed to in a plurality of tabs in the first web browser application instance;
        process a first plurality of HTML tags embedded in the plurality of webpages;
        determine, based at least in part on the processing of the first plurality of HTML tags, that a first one of the plurality of webpages has a first content type and a second one of the plurality of webpages has a second content type;
        receive an indication to browse to a new webpage, in a new tab, that is not one of the plurality of webpages;
        process a second plurality of HTML tags embedded in the new webpage;
        determine, based on the processing of the second plurality of HTML tags, that the new webpage has the first content type;
        receive an input to drag the new tab out of the plurality of tabs;
        automatically pull, based on the new webpage and the first one of the plurality of webpages having the first content type, a tab corresponding to the first one of the plurality of webpages out of the plurality of tabs with the new tab; and
        open a new web browser application instance that includes the tab corresponding to the first one of the plurality of webpages and the new tab.

2. The system of claim 1, wherein the one or more processors are further responsive to the computer-executable instructions contained in the program code and operative to:
    maintain a tab corresponding to the second one of the plurality of webpages in the first web browser application instance while the new web browser application instance that includes the tab corresponding to the first one of the plurality of webpages and the new tab is opened.

3. The system of claim 2, wherein the tab corresponding to the second one of the plurality of webpages is maintained in the first web browser application instance based on the second one of the plurality of webpages having the second content type which is different than the first content type.

4. The system of claim 1, wherein the one or more processors are further responsive to the computer-executable instructions contained in the program code and operative to:
    process one or more headings in each of the plurality of webpages, and wherein determining that the first one of the plurality of webpages has the first content type and the second one of the plurality of webpages has the second content type is further based on the processing of the one or more headings.

5. The system of claim 1, wherein the one or more processors are further responsive to the computer-executable instructions contained in the program code and operative to:
    perform a language mapping of natural language included in each of the plurality of webpages to one or more content type categories, and wherein determining that the first one of the plurality of webpages has the first content type and the second one of the plurality of webpages has the second content type is further based on performing the language mapping.

6. The system of claim 1, wherein the one or more processors are further responsive to the computer-executable instructions contained in the program code and operative to:
    apply a machine learning model that has been trained to identify web content types to each of the plurality of webpages, and wherein determining that the first one of the plurality of webpages has the first content type and the second one of the plurality of webpages has the second content type is further based on application of the machine learning model.

7. The system of claim 1, wherein the one or more processors are further responsive to the computer-executable instructions contained in the program code and operative to:
  analyze each domain of each of the plurality of webpages, and wherein determining that the first one of the plurality of webpages has the first content type and the second one of the plurality of webpages has the second content type is further based on the analysis.

8. A method for segregating web browser instances, the method comprising:
  opening a first web browser application instance, wherein an application instance comprises at least an application opening a new application window for displaying content;
  browsing to a plurality of webpages, wherein the plurality of webpages is browsed to in a plurality of tabs in the first web browser application instance;
  processing a first plurality of HTML tags embedded in the plurality of webpages;
  determining, based on the processing of the first plurality of HTML tags, that a first one of the plurality of webpages has a first content type and a second one of the plurality of webpages has a second content type;
  receiving an indication to browse to a new webpage, in a new tab, that is not one of the plurality of webpages;
  processing a second plurality of HTML tags embedded in the new webpage;
  determining, based at least in part on the processing of the second plurality of HTML tags, that the new webpage has the first content type;
  receiving an input to drag the new tab out of the plurality of tabs;
  automatically pulling, based on the new webpage and the first one of the plurality of webpages having the first content type, a tab corresponding to the first one of the plurality of webpages out of the plurality of tabs with the new tab; and
  opening a new web browser application instance that includes the tab corresponding to the first one of the plurality of webpages and the new tab.

9. The method of claim 8, further comprising:
  maintaining a tab corresponding to the second one of the plurality of webpages in the first web browser application instance while the new browser application instance that includes the tab corresponding to the first one of the plurality of webpages and the new tab is opened.

10. The method of claim 9, wherein the tab corresponding to the second one of the plurality of webpages is maintained in the first web browser application instance based on the second one of the plurality of webpages having the second content type which is different than the first content type.

11. The method of claim 8, further comprising:
  processing one or more headings in each of the plurality of webpages, and wherein determining that the first one of the plurality of webpages has the first content type and the second one of the plurality of webpages has the second content type is further based on the processing of the one or more headings.

12. The method of claim 8, further comprising:
  performing a language mapping of natural language included in each of the plurality of webpages to one or more content type categories, and wherein determining that the first one of the plurality of webpages has the first content type and the second one of the plurality of webpages has the second content type is further based on performing the language mapping.

13. The method of claim 8, further comprising:
  applying a machine learning model that has been trained to identify web content types to each of the plurality of webpages, and wherein determining that the first one of the plurality of webpages has the first content type and the second one of the plurality of webpages has the second content type is further based on application of the machine learning model.

14. The method of claim 8, further comprising:
  analyzing each domain of each of the plurality of webpages, and wherein determining that the first one of the plurality of webpages has the first content type and the second one of the plurality of webpages has the second content type is further based on the analysis.

15. A computer-readable storage device comprising executable instructions that, when executed by one or more processors, assists with segregating web browser instances, the computer-readable storage device including instructions executable by the one or more processors for:
  opening a first web browser application instance, wherein an application instance comprises at least an application opening a new application window for displaying content;
  browsing to a plurality of webpages, wherein the plurality of webpages is browsed to in a plurality of tabs in the first web browser application instance;
  processing a first plurality of HTML tags embedded in the plurality of webpages;
  determining, based on the processing of the first plurality of HTML tags, that a first one of the plurality of webpages has a first content type and a second one of the plurality of webpages has a second content type;
  receiving an indication to browse to a new webpage, in a new tab, that is not one of the plurality of webpages;
  processing a second plurality of HTML tags embedded in the new webpage;
  determining, based at least in part on the processing of the second plurality of HTML tags, that the new webpage has the first content type;
  receiving an input to drag the new tab out of the plurality of tabs;
  automatically pulling, based on the new webpage and the first one of the plurality of webpages having the first content type, a tab corresponding to the first one of the plurality of webpages out of the plurality of tabs with the new tab; and
  opening a new web browser application instance that includes the tab corresponding to the first one of the plurality of webpages and the new tab.

16. The computer-readable storage device of claim 15, wherein the instructions are further executable by the one or more processors for:
  maintaining a tab corresponding the second one of the plurality of webpages in the first web browser application instance while the new web browser application that includes the tab corresponding to the first one of the plurality of webpages and the new tab is opened.

17. The computer-readable storage device of claim 16, wherein the tab corresponding to the second one of the plurality of webpages is maintained in the first web browser application instance based on the second one of the plurality of webpages having the second content type which is different than the first content type.

18. The computer-readable storage device of claim 15, wherein the instructions are further executable by the one or more processors for:

processing one or more headings in each of the plurality of webpages, and wherein determining that the first one of the plurality of webpages has the first content type and the second one of the plurality of webpages has the second content type is further based on the processing of the one or more headings.

\* \* \* \* \*